United States Patent [19]

Yamanaka et al.

[11] 4,263,050
[45] Apr. 21, 1981

[54] PROCESS FOR PREPARATION OF GRANULES CONTAINING VISCOUS SUBSTANCE AT HIGH CONCENTRATION

[75] Inventors: Makoto Yamanaka, Koganei; Takehiko Kobayashi, Zushi; Takashi Fujino, Yokohama, all of Japan

[73] Assignee: Kao Soap Co., Ltd., Tokyo, Japan

[21] Appl. No.: 859,190

[22] Filed: Dec. 8, 1977

Related U.S. Application Data

[63] Continuation of Ser. No. 679,042, Apr. 21, 1976, abandoned.

[30] Foreign Application Priority Data

Apr. 30, 1975 [JP] Japan .................. 50-52190

[51] Int. Cl.³ .................. C11D 11/00; C11D 11/04
[52] U.S. Cl. .................. 106/287.17; 106/74; 106/77; 106/81; 106/84; 106/85; 106/109; 106/163 R; 106/169; 106/177; 106/188; 106/193 J; 106/197 C; 106/287.18; 106/287.34; 106/306; 106/308 C; 106/308 M; 106/309; 106/311; 252/91; 252/135; 252/139; 252/140; 252/174.13; 252/174.21; 252/174.25; 252/DIG. 1; 260/17 R; 260/17.4 CL; 260/29.6 B; 260/29.6 BE
[58] Field of Search .................. 106/74, 84, 77, 81, 106/85, 308 M, 311, 308 C, 300, 287.34, 163 R, 109, 169, 177, 188, 197 C, 287.17, 193 J, 287.18, 309; 260/17 R, 17.4 CL, 29.6 BE, 29.6 B; 252/174.21, DIG. 1, 135, 139, 140, 174.13, 91

[56] References Cited

U.S. PATENT DOCUMENTS

| | | | |
|---|---|---|---|
| 3,126,355 | 3/1964 | Birten et al. | 260/23 R |
| 3,152,917 | 10/1964 | McCoy | 106/272 |
| 3,769,222 | 10/1973 | Yurko et al. | 252/DIG. 1 |
| 3,849,327 | 11/1974 | DiSalvo et al. | 252/109 |
| 3,868,336 | 2/1975 | Mazzola et al. | 252/139 X |
| 3,915,878 | 10/1975 | Yurko et al. | 252/DIG. 1 |
| 4,029,608 | 6/1977 | Murata et al. | 252/135 X |

FOREIGN PATENT DOCUMENTS 7016750 5/1971 Netherlands .................. 106/201

OTHER PUBLICATIONS

Encyclopedia of Chem. Technology, vol. 3, pp. 339-342, vol. 4, 643-647, vol. 18, 61-72, 157-159, vol. 19, 608-610, Kirk et al.

Condensed Chemical Dictionary, p. 783, 8th Ed.

*Primary Examiner*—Howard E. Schain
*Attorney, Agent, or Firm*—Blanchard, Flynn, Thiel, Boutell & Tanis

[57] ABSTRACT

A process for the preparation of granules containing a high concentration of a viscous substance, which granules are free-flowing and are not likely to cake or agglomerate under normal storage conditions, characterized by the steps of incorporating in a viscous substance selected from the group consisting of higher alcohols having 8 to 18 carbon atoms and which are soft or molten or liquid at a temperature lower than 40° C., and non-ionic surfactants having the formulae (I) and (II):

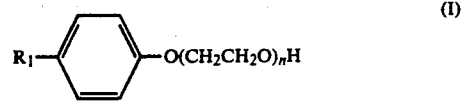

and

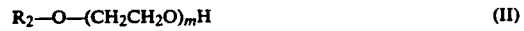

wherein $R_1$ is alkyl having 4 to 18 carbon atoms, $R_2$ is alkyl or alkenyl having 8 to 22 carbon atoms, and n and m each is a number of from 1 to 50, (A) from about 40 to about 300% by weight, based on the weight of said viscous substance, of an organic or inorganic compound capable of being rapidly transformed to a hydrated salt by water of crystallization to form porous particles or capable of adsorbing physically water to form superficially porous particles, and (B) about 30 to about 100% by weight, based on the weight of said viscous substance, of an inorganic substance having a high affinity with said viscous substance and an effect of controlling the flowability of said viscous substance, then adding to the resulting mixture, (C) an aqueous solution of an inorganic or organic compound that is adhesive to the substance (A), said solution containing water in an amount sufficient to impart at least one mole of water of crystallization or saturated water of adsorption to the substance (A), kneading the mixture and granulating the kneaded mixture.

6 Claims, No Drawings

PROCESS FOR PREPARATION OF GRANULES CONTAINING VISCOUS SUBSTANCE AT HIGH CONCENTRATION

This is a continuation of application Ser. No. 679,042 filed Apr. 21, 1976 now abandoned.

BACKGROUND OF THE INVENTION

The present invention relates to a process for the preparation of non-sticky particles containing a high concentration of a highly viscous substance. More particularly, the invention relates to a process for preparing, by granulation, non-sticky particles containing a high concentration of a viscous substance selected from the group consisting of higher alcohols having 8 to 18 carbon atoms and which are soft or molten or liquid at a temperature lower than 40° C. and non-ionic surface active agents having the following formulae (I) and (II):

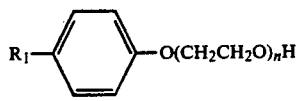 (I)

and $R_2$—O—$(CH_2CH_2O)_m$H (II)

wherein $R_1$ is alkyl having 4 to 18 carbon atoms, $R_2$ is alkyl or alkenyl having 8 to 22 carbon atoms, and n and m each is a number of from 1 to 50.

DESCRIPTION OF THE PRIOR ART

As means for granulating the viscous substances mentioned above, there is known a method which comprises adding to the viscous substance a fine powder of an inorganic substance such as aluminum hydroxide, talc or the like. In particles prepared by this known method, however, it is difficult to prevent cohesion and caking of the particles during storage, and the concentration of the viscous substance has to be reduced to 20 weight % at most, usually 10 weight % or lower. Of course, if the desired property of solubility or dispersibility in water is sacrificed, it is possible to increase the concentration of the viscous substance to a level approximating 40 weight %. In this case, however, particles having a practical utility cannot be obtained.

For example, Japanese Patent Publication No. 25630/65 discloses a method in which a water-insoluble synthetic resin film is formed on the viscous substance. According to this method, however, since attainment of improvements of moisture resistance and water resistance is intended, even if caking is prevented, the resulting particles cannot be applied to use in aqueous systems.

Further, Japanese Patent Publication No. 25317/64 discloses a process for preventing caking by treating surfaces of particles with non-sticky fine powder. According to this process, the non-sticky fine powder should be employed in a large quantity if a viscous substance such as those mentioned above is treated.

SUMMARY OF THE INVENTION

We have discovered a process for preparing a granulated product which is free of a tendency to cake and which contains at least 20 weight % of a viscous substance such as those mentioned above, without sacrifice of the water solubility or dispersibility thereof.

More specifically, in accordance with the present invention, there is provided a process for the preparation of granules containing a high concentration of a viscous substance, which granules are free-flowing and not apt to cake or agglomerate under normal storage conditions at ambient temperatures and ambient humidity conditions. According to the invention, there are incorporated in at least one viscous substance selected from the group consisting of higher alcohols having 8 to 18 carbon atoms and which are soft or molten or liquid at a temperature lower than 40° C. and non-ionic surfactants having the foregoing formulae (I) and (II), (A) about 40 to about 300 weight %, based on the weight of said viscous substance, of an organic or inorganic compound capable of catching rapidly water of crystallization to form porous particles or of adsorbing physically water to form superficially porous particles, and (B) about 30 to about 100 weight %, based on the weight of said viscous substance, of an inorganic substance having a high affinity with said viscous substance and an effect of controlling the flowability of said viscous substance, then adding to the resulting mixture, (C) an aqueous solution of an inorganic or organic compound that is adhesive to substance (A), said solution containing water in an amount sufficient to impart at least one mole of water of crystallization or saturated water of adsorption to the substance (A), kneading the mixture to make it homogeneous and then granulating the kneaded mixture.

As the alcohol according to this invention, there is preferred an alcohol having the formula ROH wherein R is an acyclic saturated or ethylenically unsaturated hydrocarbon group having 8 to 18 carbon atoms.

As is seen from the foregoing description, the main substances to be added to the viscous substance, according to the process of the present invention, are the following three substances:

(A) An organic or inorganic substance capable of catching rapidly water of crystallization to form porous particles of hydrated salts or of adsorbing physically water to form apparently porous articles, which substance (A) includes, for example, inorganic compounds such as anhydrous sodium sulfate, anhydrous sodium tripolyphosphate, talc, bentonite and anhydrous calcium sulfate, and organic compounds water-insoluble cellulosic pulp and water-soluble cellulosic pulp such as hydroxyethyl cellulose and carboxymethyl cellulose.

(B) Fine powder of an inorganic compound having a high affinity with the viscous substance, a high absorbing property to the viscous substance and an effect of controlling the flowability of the viscous substance, which includes, for example, anhydrous silicic acid, aluminum silicate, magnesium silicate, calcium silicate, zeolites and aluminum hydroxide.

(C) An aqueous solution of an organic or inorganic compound capable of acting as an adhesive to the substance (A) while imparting water of crystallization or physically adsorbed water to the substance (A), which includes for example, aqueous solutions of sodium silicate, colloidal silica, colloidal aluminum, polyvinyl alcohol, sodium carboxymethyl cellulose and polyethylene glycol (having a molecular weight of at least 3,000).

The amount used of the substance (A) is about 40 to about 300 weight %, based on the weight of the viscous substance.

The amount used of the substance (B) is about 30 to about 100 weight %, based on the weight of the viscous substance.

The amount used of the substance (C) is such that water of crystallization is imparted to the substance (A) in an amount necessary for forming from a monohydrate to the maximum extent of hydration of the substance (A), or the substance (A) contains a maximum saturation amount of physically adsorbed water. An amount of the substance (C) to be added is preferred to range from 0.1 to 0.5 wt.% in the form of its aqueous solution having a concentration of 1 to 50 wt.%.

In order for the substance (A) to catch water of crystallization with ease and to form more porous cross-linked particles, it is preferred that the particle size of substance (A) is smaller than 60 mesh.

In order to control the flowability of the viscous substance sufficiently, it is preferred that the surface area of the substance (B) be large, namely, the particle size of substance (B) should be smaller than 30 microns.

According to the process of the present invention, the substance (B) is added to the viscous substance to control the flowability of the viscous substance, and then, the substance (A) is added to the mixture and the mixture is sufficiently blended and kneaded to form a homogeneous mixture. Then, the substance (C) is added in a total amount calculated so that the substance (A) comes to contain water in an amount necessary to transform (A) into porous particles. Substance C is gradually blended in the mixture over a period of 30 to 40 minutes while cooling the mixture with water or air, whereby the water in the substance (C) is caught in the substance (A) as water of crystallization, or physically adsorbed water, and porous particles are formed and simultaneously, the viscous substance having a reduced flowability is included in the voids of the thus-formed porous particles of (A).

The thus-obtained porous particles are granulated into larger particles by an extruding or rotary granulator. Thus, the viscous substance can be contained in the granulated product in an amount of 20 to 50 weight %, and a granulated product free of a tendency to cake and having a good water dispersibility can be obtained.

When the speed of forming cross-linked particles of (A) by inclusion of water of crystallization is too high, violent heat generation takes place and large agglomerates are readily formed. Further, it becomes difficult to include the viscous substance in the porous particles. Accordingly, the reaction of the water with (A) should be advanced gradually by suitably controlling the rate of addition of the aqueous solution of substance (C) so that no caking or agglomeration of (A) occurs.

The present invention will now be further described in more detail by reference to the following illustrative Examples.

EXAMPLE 1

| | |
|---|---|
| Polyoxyalkylene (17) alkyl (C18) ether | 13.5 Kg |
| Anhydrous sodium tripolyphosphate | 22.0 Kg |
| Anhydrous silicic acid | 5.0 Kg |
| Aqueous solution of sodium silicate (solid content = 40 wt. %) | 3.0 Kg |

Polyoxyethylene (17) alkyl (C18) ether as the viscous substance was sufficiently mixed with anhydrous sodium tripolyphosphate and anhydrous silicic acid in a mixer, and then, an aqueous solution of diatomaceous earth No. 3 was added to the mixture.

Water in the aqueous solution of the diatomaceous earth No. 3 became included in anhydrous sodium tripolyphosphate as water of crystallization and heat was gradually generated. The entire mixture was gradually plasticized and partial granulation was initiated. The mixture was granulated by an extruding granulator to obtain a granulated product having a size of 12 to 48 mesh (JIS).

EXAMPLE 2

| | |
|---|---|
| Polyoxyethylene (9) secondary alkyl (C14) ether | 17.4 Kg |
| Anhydrous sodium tripolyphosphate | 11.0 Kg |
| Calcium silicate | 8.7 Kg |
| 5% Aqueous solution of polyvinyl alcohol | 2.0 Kg |

Polyoxyethylene (9) secondary alkyl (C14) ether was sufficiently mixed with calcium silicate, and anhydrous sodium tripolyphosphate was added thereto. Mixing was further continued and the aqueous solution of polyvinyl alcohol was gradually added. The anhydrous sodium tripolyphosphate caught the water of the aqueous solution as water of crystallization and heat was generated. Thus, cross-linked porous particles were formed, and solidification was initiated in the particles containing as inclusions therein the polyoxyethylene (9) secondary alkyl (C14) ether as the viscous substance. Then, the particles were broken and granulated into a size of 12 to 48 mesh (JIS).

EXAMPLE 3

| | |
|---|---|
| Oleyl alcohol (viscous substance) | 12.0 Kg |
| Anhydrous sodium sulphate | 8.2 Kg |
| Crystalline cellulose | 2.0 Kg |
| Aluminum silicate | 4.8 Kg |
| 10% Aqueous solution of polyethylene glycol (molecular weight = 6000) | 3.0 Kg |

Crystalline cellulose and aluminum silicate were blended in oleyl alcohol, and anhydrous sodium sulfate was added and the mixture was sufficiently agitated. When the aqueous solution of polyethylene glycol was added to the mixture, the anhydrous sodium sulfate caught the water of the aqueous solution as water of crystallization to form cross-linked particles. The particles were granulated to a size of 12 to 48 mesh (JIS) by a rotary granulator.

EXAMPLE 4

| | |
|---|---|
| Lauryl alcohol (viscous substance) | 20.0 Kg |
| Dissolvable fine powder of cellulosic pulp | 14.0 Kg |
| Magnesium silicate | 6.0 Kg |
| 20% Aqueous solution of colloidal silica | 3.0 Kg |

All the components were mixed simultaneously and on completion of the mixing, the mixture was formed into granules having a size of 12 to 48 mesh.

COMPARATIVE EXAMPLE 1

| | |
|---|---|
| Oleyl alcohol (viscous substance) | 10 Kg |
| Anhydrous silicic acid | 20 Kg |
| 10% Aqueous solution of polyvinyl alcohol | 0.6 Kg |

A mixture having the above composition was blended by agitation and formed into granules having a size of 12 to 48 mesh (JIS). The granulated product was dried at 60° C. for 1 hour.

COMPARATIVE EXAMPLE 2

| | |
|---|---|
| Polyoxyethylene (17) alkyl (C18) ether | 10 Kg |
| Aluminum silicate | 20 Kg |
| Aqueous solution of sodium silicate (solid content = 40%) | 1 Kg |

A mixture having the above composition was blended by agitation and granulated into a size of 12 to 48 mesh (JIS). The granulated product was dried at 60° C. for 1 hour.

COMPARATIVE EXAMPLE 3

| | |
|---|---|
| Polyoxyethylene (9) secondary alkyl (C14) ether | 10 Kg |
| Aluminum hydroxide | 20 Kg |
| Polyethylene glycol (molecular weight = 6000) | 3 Kg |

A mixture having the above composition was blended by agitation and granulated into a size of 12 to 48 mesh.

The granulated products obtained in Examples 1 to 4 and Comparative Examples 1 to 3 were subjected to various tests. The results shown below were obtained.

TABLE 1

| | Ease of granulation | Necessity of special drying step to obtain granules | Caking property during storage* | Bleeding in air at 50° C.** | Dissolution Time*** (min) |
|---|---|---|---|---|---|
| Example 1 | easy | unnecessary | not observed | not observed | 4 |
| Example 2 | easy | unnecessary | not observed | not observed | 3 |
| Example 3 | easy | unnecessary | not observed | not observed | 3 |
| Example 4 | easy | unnecessary | not observed | not observed | 2 |
| Comparative Example 1 | easy | necessary | observed | observed | 13 |
| Comparative Example 2 | easy | necessary | observed | observed | 10 |
| Comparative Example 3 | easy | unnecessary | observed | observed | 11 |

Notes:
*occurrence of caking was examined after the granulated product had been stored for 10 days in a state wherein 10 bags were piled on top of one another, each bag containing 25 Kg of the granulated product.
**30 g of the granulated product was placed in a Petri dish having a depth of 30 mm and a diameter of 60 mm, and the dish was allowed to stand still in an air-conditioned chamber maintained at a temperature of 50° C. and a relative humidity of 65% and bleeding of the viscous substances onthe surfaces of particles was visually examined.
***30 l of water maintained at 25° C. was charged ina commercially available washing machine, and 40g of the granulated product was placed into thewater and the time (minutes) required for completedissolution was measured.

The embodiments of the invention in which an exclusive property or privilege is claimed are defined as follows:

1. A process for preparing free-flowing granules containing a high concentration of viscous substance which consists essentially of the steps of (1) blending into a viscous substance selected from the group consisting of alcohols having from 8 to 18 carbon atoms and which are soft, molten or liquid at a temperature lower than 40° C., and nonionic surfactants having the formulae

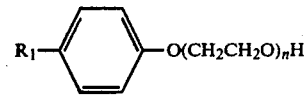

and $$R_2-O-(CH_2CH_2O)_mH$$

wherein $R_1$ is alkyl having 4 to 18 carbon atoms, $R_2$ is alkyl or alkenyl having 8 to 22 carbon atoms, and n and m is a number of from one to 50, and mixtures thereof, from about 40 to about 300 percent by weight, based on the weight of said viscous substance, of solid particles of a first substance (A) selected from the group consisting of anhydrous sodium sulfate, anhydrous sodium tripolyphosphate, talc, bentonite, anhydrous calcium sulfate, crystalline cellulose, water-insoluble cellulosic pulp, hydroxyethyl cellulose, carboxymethyl cellulose and mixtures thereof, said solid particles of said first substance (A) having a particle size of smaller than about 60 mesh and being capable of being transformed to porous particles by absorbing water as water of crystallization or by physically absorbing water, and from about 30 to about 100 percent by weight, based on the weight of said viscous substance, of particles of second substance (B) selected from the group consisting of anhydrous silicic acid, aluminum silicate, magnesium silicate, calcium silicate, zeolites, aluminum hydroxide and mixtures thereof, said particles of said second substance (B) having a particle size of smaller than about 30 microns and having a high affinity to said viscous substance and capable of controlling the flowability of said viscous substance, to form a homogeneous first mixture consisting essentially of said viscous substance, first substance (A) and second substance (B), (2) then adding to and blending in said first mixture obtained as the product of step (1), an aqueous solution of a third substance (C) having adhesiveness to said first mixture, said third substance (C) being selected from the group consisting of sodium silicate, colloidal silica, colloidal aluminum, polyvinyl alcohol, sodium carboxymethyl cellulose, polyethylene glycol having a molecular weight of at least 3000 and mixtures thereof, said aqueous solution of said third substance (C) containing sufficient water to impart to first substance (A) at least one mole of water of crystallization or sufficient water of absorption to fully saturate said first substance (A) whereby to transform said first substance (A) to porous particles, said third substance (C) being added to and blended in the first mixture at a controlled rate effective to gradually form porous particles of said first substance (A) containing said viscous substance in the voids of the thus-formed porous particles of said first substance (A), without forming agglomerates thereof whereby to obtain a homogeneous second mixture consisting essentially of said viscous substance, said first substance (A), said second substance (B) and said third substance (C), then granulating the second mixture and obtaining granules thereof.

2. A process as claimed in claim 1 in which said viscous substance consists of said non-ionic surfactant, and said first substance (A) is selected from the group consisting of anhydrous sodium tripolyphosphate and anhydrous sodium sulphate.

3. A process as claimed in claim 1, in which in the granulating step, said second mixture is granulated by an extruding or rotary granulator to form granules having a size of 12 to 48 mesh.

4. A process as claimed in claim 1, in which in step (2), the aqueous solution of third substance (C) is added over a period of 30 to 40 minutes while cooling the mixture.

5. A process as claimed in claim 1 in which said first substance (A) is anhydrous sodium tripolyphosphate, said second substance (B) is anhydrous silicic acid, aluminum silicate, magnesium silicate, calcium silicate or mixture thereof, and said third substance (C) is polyethylene glycol having a molecular weight of at least 3,000.

6. A process as claimed in claim 1 in which said alcohols have the formula ROH wherein R is an acyclic saturated or ethylenically unsaturated hydrocarbon group having 8 to 18 carbon atoms.

* * * * *